US008051306B2

(12) United States Patent
Wong et al.

(10) Patent No.: US 8,051,306 B2
(45) Date of Patent: Nov. 1, 2011

(54) PORTABLE COMPUTER WITH SHARED HARDWARE RESOURCES

(75) Inventors: Shih-Fang Wong, Taipei Hsien (TW);
Tsung-Jen Chuang, Taipei Hsien (TW);
Lei-Tong Yu, Shenzhen (CN);
Yu-Zhang Wen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 721 days.

(21) Appl. No.: 12/168,844

(22) Filed: Jul. 7, 2008

(65) Prior Publication Data

US 2009/0044028 A1   Feb. 12, 2009

(30) Foreign Application Priority Data

Aug. 6, 2007   (CN) .......................... 2007 1 0201287

(51) Int. Cl.
*G06F 1/00* (2006.01)
*G06F 13/00* (2006.01)
*G06F 13/14* (2006.01)

(52) U.S. Cl. ..................... 713/300; 710/100; 710/305
(58) Field of Classification Search .................. 713/300; 710/100, 305
See application file for complete search history.

(56) References Cited

U.S. PATENT DOCUMENTS

| 4,335,456 A * | 6/1982 | Gaiser et al. ................. 370/383 |
| 5,831,351 A * | 11/1998 | Khosrowpour et al. ...... 307/139 |
| 6,126,332 A * | 10/2000 | Cubbage et al. .................. 710/2 |
| 6,225,664 B1 * | 5/2001 | Endo et al. ..................... 257/347 |
| 6,249,363 B1 * | 6/2001 | Arita et al. ........................ 398/9 |
| 6,295,213 B1 * | 9/2001 | Smith ......................... 363/21.01 |
| 6,378,012 B1 * | 4/2002 | Bass et al. ......................... 710/72 |
| 6,538,880 B1 * | 3/2003 | Kamijo et al. ............. 361/679.4 |
| 6,604,199 B1 * | 8/2003 | Yang et al. ..................... 713/300 |
| 6,735,663 B2 * | 5/2004 | Watts et al. .................... 710/313 |

(Continued)

FOREIGN PATENT DOCUMENTS

CN   2638140 Y   9/2004

(Continued)

OTHER PUBLICATIONS

Watanabe, R.; Kondo, M.; Nakamura, H.; Nanya, T.; , "Power reduction of chip multi-processors using shared resource control cooperating with DVFS," Computer Design, 2007. ICCD 2007. 25th International Conference on , pp. 615-622, Oct. 7-10, 2007.*

(Continued)

*Primary Examiner* — Faisal M Zaman
(74) *Attorney, Agent, or Firm* — Altis Law Group, Inc.

(57) ABSTRACT

The invention provides a portable computer with shared hardware resources that can be used by other computers. The portable computer includes an interface converter, a control module, a power management module, and a power path switch. When the portable computer is powered off and connected with a computer host through a serial bus interface, the shared hardware resources of the portable computer obtain power from the computer host through the serial bus interface. The interface converter converts data between a shared hardware resource interface format and a serial bus interface format, and enables the shared hardware resources to communicate with the computer host and therefore are employed by the computer host. In one embodiment, the shared hardware resources include a keyboard. In another embodiment, the shared hardware resources include a keyboard and a display.

17 Claims, 5 Drawing Sheets

U.S. PATENT DOCUMENTS

| | | | |
|---|---|---|---|
| 6,894,439 B2 * | 5/2005 | Stewart et al. | 315/241 P |
| 6,963,487 B2 * | 11/2005 | Billington et al. | 361/679.41 |
| 6,965,954 B2 * | 11/2005 | Okamoto | 710/65 |
| 6,999,008 B2 * | 2/2006 | Wang et al. | 341/22 |
| 7,228,363 B1 * | 6/2007 | Wehrle et al. | 710/10 |
| 7,278,034 B2 * | 10/2007 | Shipton | 713/300 |
| 7,383,452 B2 * | 6/2008 | Veselic | 713/300 |
| 7,421,602 B2 * | 9/2008 | Sutardja | 713/324 |
| 7,516,345 B2 * | 4/2009 | Choi | 713/323 |
| 7,523,338 B2 * | 4/2009 | Fu et al. | 713/340 |
| 7,624,210 B2 * | 11/2009 | Izutsu | 710/62 |
| 7,706,850 B2 * | 4/2010 | Parivash | 455/575.4 |
| 7,719,528 B2 * | 5/2010 | Lee | 345/211 |
| 7,765,414 B2 * | 7/2010 | Chuang et al. | 713/300 |
| 2001/0054878 A1 * | 12/2001 | Odaohhara | 320/118 |
| 2002/0051083 A1 * | 5/2002 | Aratani et al. | 348/554 |
| 2002/0052227 A1 * | 5/2002 | Yamatani | 455/572 |
| 2003/0065734 A1 * | 4/2003 | Ramakesavan | 709/211 |
| 2005/0138576 A1 * | 6/2005 | Baumert et al. | 715/862 |
| 2005/0289276 A1 * | 12/2005 | Karschnia et al. | 710/305 |
| 2007/0011715 A1 * | 1/2007 | Hsuan | 725/133 |
| 2008/0030166 A1 * | 2/2008 | Cato et al. | 320/111 |
| 2009/0307390 A1 * | 12/2009 | Bennett | 710/36 |

FOREIGN PATENT DOCUMENTS

| | | | |
|---|---|---|---|
| JP | 05342388 A | * | 12/1993 |
| JP | 07273719 A | * | 10/1995 |
| JP | 2002064624 A | * | 2/2002 |
| JP | 2004118408 A | * | 4/2004 |
| JP | 2008306254 A | * | 12/2008 |

OTHER PUBLICATIONS

Kyong Hoon Kim; Buyya, R.; Jong Kim; , "Power Aware Scheduling of Bag-of-Tasks Applications with Deadline Constraints on DVS-enabled Clusters," Cluster Computing and the Grid, 2007. CCGRID 2007. Seventh IEEE International Symposium on , pp. 541-548, May 14-17, 2007.*

Sofie Pollin; Rahul Mangharam; Bruno Bougard; Liesbet Van Der Perre; Ingrid Moerman; Ragunathan Rajkumar; Francky Catthoor; , "MEERA: cross-layer methodology for energy efficient resource allocation in wireless networks," Wireless Communications, IEEE Transactions on , vol. 6, No. 2, pp. 617-628, Feb. 2007.*

Wei Wang; Srinivasan, V.; Kee-Chaing Chua; , "Power Control for Distributed MAC Protocols in Wireless Ad Hoc Networks," Mobile Computing, IEEE Transactions on , vol. 7, No. 10, pp. 1169-1183, Oct. 2008.*

* cited by examiner

PORTABLE COMPUTER WITH SHARED HARDWARE RESOURCES

BACKGROUND

1. Technical Field

The present invention relates to portable computers, and particularly to a portable computer with shared hardware resources accessible when the portable computer is powered off.

2. General Background

Nowadays, portable computers have become more and more popular because it is convenient to carry and use. However, the hardware resources (e.g., keyboard, display) of the portable computer can only be exclusively used by the portable computer, which limits the usability of the portable computer and other computers that would otherwise be able to take advantage of the hardware of the potable computer.

Therefore, it is necessary to provide a portable computer having hardware resources shared by other computers.

SUMMARY

The present embodiment provides a portable computer with shared hardware resources that can be shared by other computer host. Thus increasing the functionality of the portable computer.

The portable computer capable of sharing hardware resources with a computer host, the portable computer includes: a power module, a shared hardware resource, a serial bus interface, an interface converter, a power management module, a power path switch and a control module. The power module is used for powering on and keeping the portable computer operable. The serial bus interface having a data pin and a power pin, the data pin being capable of transmitting data between the shared hardware resource and the computer host and the power pin being capable of receiving power from the computer host. The interface converter is connected between the shared hardware resource and the data pin of the serial bus interface, and used for converting the data between a shared hardware resource interface format and a serial bus interface format.

The power management module is capable of obtaining power from the power pin of the serial bus interface and distributing the power to the shared hardware resource and the interface converter. The power path switch is capable of continuing or discontinuing the power from the serial bus interface to the power management module. The control module is capable of controlling the power path switch to discontinue supply power when the portable computer is powered on, and controlling the power path switch to supply the power when the portable computer is powered off.

when the portable computer is powered on, the control module switches off the power path switch and discontinues the power to the power management module, the power management module discontinues the power to the shared hardware resource and the interface converter and disables the interface converter, and when the portable computer is powered off, the control module switches on the power path switch and continues the power to the power management module, the power management module distributes the power from the power pin of the serial bus interface to the shared hardware resource and the interface converter, then enabling the shared hardware resource to communicate with the computer host via the interface converter.

The present embodiment provide a portable computer with shared hardware resource, when the portable computer is powered off, the other computer can use the shared hardware resource of the portable computer.

BRIEF DESCRIPTION OF THE DRAWINGS

The components in the drawings are not necessarily drawn to scale, the emphasis instead being placed upon clearly illustrating the principles of the present portable computer. Moreover, in the drawings, like reference numerals designate corresponding parts throughout the several views.

DETAILED DESCRIPTION OF THE EXEMPLARY EMBODIMENTS

Figure 1:
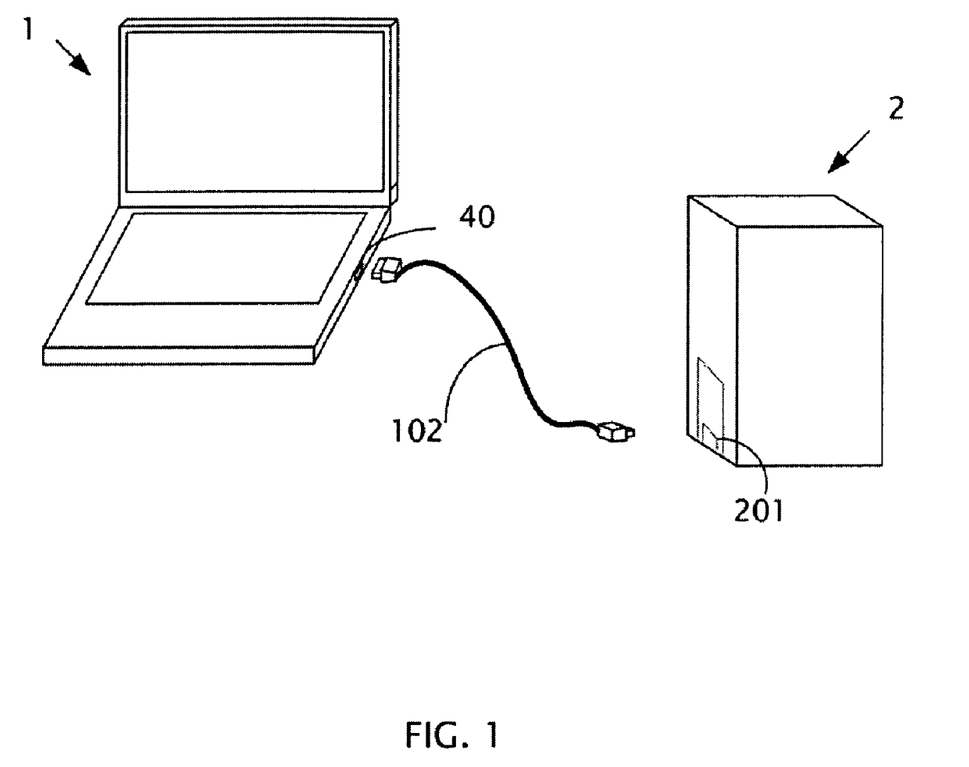
FIG. 1 is a isometric view of a portable computer with shared hardware resources and a computer host that is capable of employing the shared hardware resources of the portable computer via a data cable.

FIG. 1 is a isometric view of a portable computer 1 with shared hardware resources and a computer host 2 that is capable of employing the shared hardware resources of the portable computer 1 via a data cable 102. The data cable 102 has a connector at each end. One connector of the data cable 102 is configured for being plugged in a serial bus interface 40 of the portable computer 1, and the other connector of the data cable 102 is configured for being plugged in a serial bus interface 201 of the computer host 2. Via the data cable 102, the computer host 2 is capable of using the shared hardware resources of the portable computer 1 after the portable computer 1 is powered off. For example, if a keyboard and a display of the portable computer 1 are the shared hardware resources, the keyboard can be adopted as an input device of the computer host 2 and the display can be adopted as a display device of the computer host 2 when the portable computer 1 has been powered off.

Figure 2:
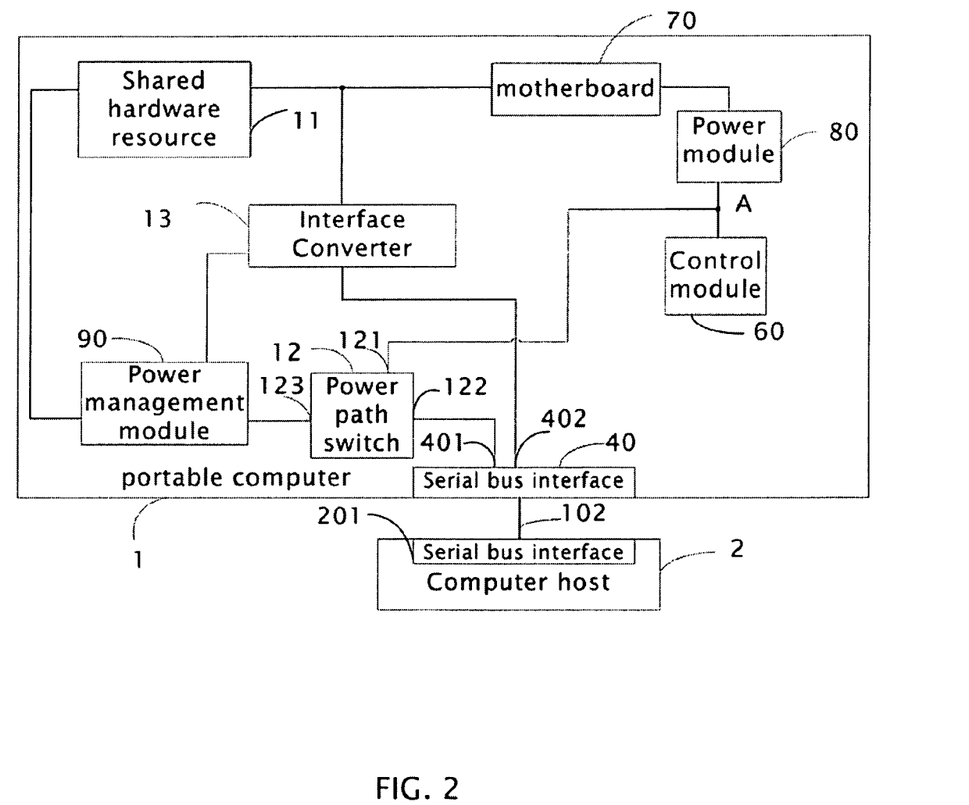
FIG. 2 is a block diagram of the portable computer with shared hardware resources in accordance with an exemplary embodiment of the present invention.

FIG. 2 is a block diagram of the portable computer 1 in accordance with an exemplary embodiment of the present invention. The portable computer 1 includes at least a shared hardware resource 11, a power path switch 12, an interface converter 13, the serial bus interface 40, a control module 60, a motherboard 70, a power module 80, and a power management module 90.

The interface converter 13 is connected between the shared hardware resource 11 and a data pin 402 of the serial bus interface 40. The interface converter 13 is configured to convert data between a shared hardware resource interface format and a serial bus interface format, thus making the communication between the shared hardware resource 11 and the serial bus interface 40 possible.

The control module 60 includes a control terminal A that connects with a power output port of the power module 80. The power path switch 12 includes a control terminal 121, a first path terminal 122 and a second path terminal 123. The control terminal 121 of the power path switch 12 is connected to the control terminal A of the control module 60. The path terminals 122 and 123 of the power path switch 12 are connected to a power pin 401 of the serial bus interface 40 and a power input port (not shown) of the power management module 90 respectively. The power management module 90 is configured to distribute power from the serial bus interface 40 to the shared hardware resource 11 and the interface converter 13. The shared hardware resource 11 is further connected to the motherboard 70.

When the portable computer 1 is powered on, the control module 60 switches off the power path switch 12. No power is supplied to the interface converter 13 and the interface converter 13 is disabled. The shared hardware resource 11 communicates with the motherboard 70 and is integrated with the portable computer 1.

When the portable computer 1 is powered off, the power path switch 12 is switched on. The shared hardware resource 11 is powered by the computer host 2 when the portable computer 1 connects with the computer host 2 through the data cable 102. Specifically, the computer host 2 provides power to the power management module 90 through the data cable 102, the power pin 401 of the serial bus interface 40 obtain power from a power pin of the serial bus interface 201. The power management module 90 further distributes the power to the shared hardware resource 11 and the interface converter 13. The shared hardware resource 11 and the interface converter 13 are enabled and the shared hardware resource 11 communicates with the computer host 2 through the interface converter 13.

Figure 3:
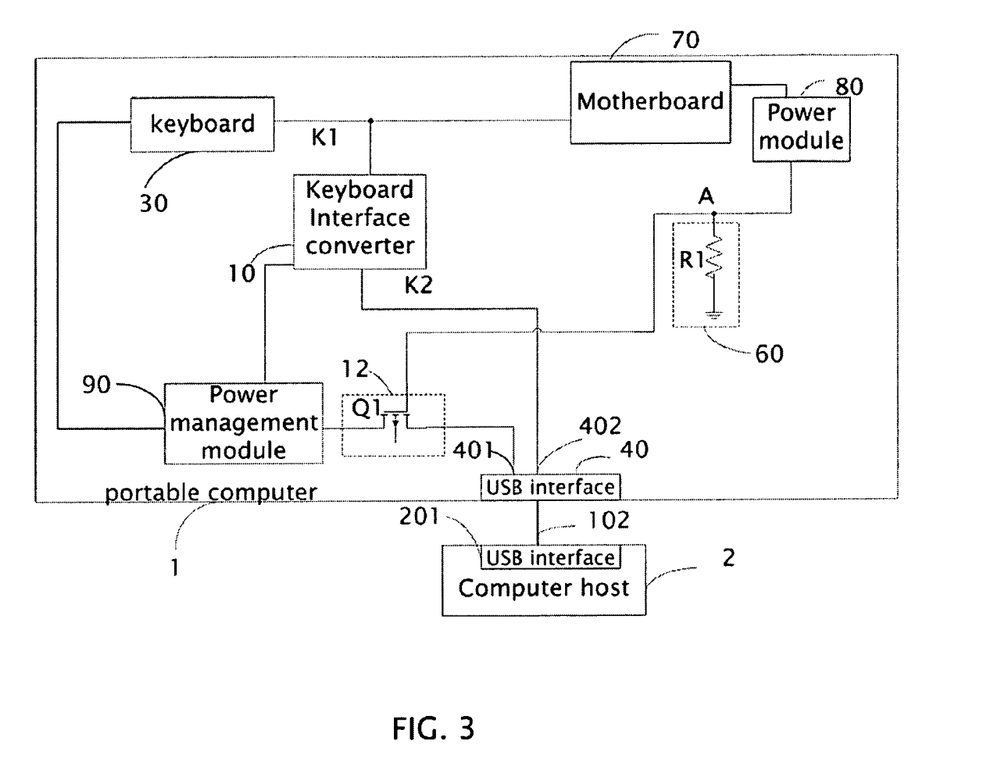
FIG. 3 shows a first implementation of FIG. 2.

FIG. 3 is a first implementation of the exemplary embodiment of FIG. 2. In the implementation, the serial bus interfaces 40 and 201 are universal serial bus (USB) interfaces 40 and 201, and in other implementations, the serial bus interfaces 40 and 201 can be IEEE 1394 interfaces. The USB interface 40 is connected to the USB interface 201 of the computer host 2 via the data cable 102. The shared hardware resource 11 is a keyboard 30 of the portable computer 1 and the interface converter 13 is a keyboard interface converter 10 which is configured to convert keyboard interface format data K1 to USB interface format keyboard data K2, the keyboard interface converter 10 is connected between the keyboard 30 and the data pin 402 of the serial bus interface 40. The power path switch 12 is a p-channel metal-oxide-semiconductor field-effect transistor (PMOSFET) Q1. A gate, a source and a drain of the PMOSFET Q1 constitute the control terminal, the first path terminal and the second path terminal of the power path switch 12 respectively. In other examples, the power path switch 12 can be a positive—negative—positive (PNP) BJT. The control module 60 is constituted by a resistor having a first terminal connected to ground and a second terminal constituting the control terminal A.

When the portable computer 1 is powered on, the control terminal A of the control module 60 is at a high voltage. The gate of the PMOSFFT Q1 is also at the high voltage and thus the PMOSFFT Q1 is switched off. A connection between the power management module 90 and the power pin 401 of the USB interface 40 is cut off. The power management module 90 discontinues the power to the keyboard interface converter 10 and the keyboard 30. The keyboard 30, as well as other components of the portable computer 1, is powered by the power module 80 of the portable computer 1.

When the portable computer 1 is powered off, the power module 80 discontinues to supply power. The control terminal A of the control module 60 is at a low voltage. The gate of the PMOSFET Q1 is also at the low voltage and the PMOSFET Q1 is switched on. When the portable computer 1 is connected to the computer host 2 through the data cable 102, the power pin 401 obtains a power from the power pin of the computer host 2. The power management module 90 receives the power from the power pin 401 of the USB interface 40 through the PMOSFET Q1 and distributes suitable voltages to the keyboard 30 and the keyboard interface converter 10. The keyboard interface converter 10 stores a keyboard identifier (not shown). The keyboard identifier is obtained by the computer host 2 in order to select a corresponding program to drive the keyboard 30.

The keyboard interface converter 10 converts the keyboard interface format data K1 to the USB interface format keyboard data K2 and transmits the USB interface format keyboard data K2 to the computer host 2 through the USB interfaces 40 and 201. Via such a configuration, the keyboard 30 is capable of serving as an input device for the computer host 2.

Figure 4:
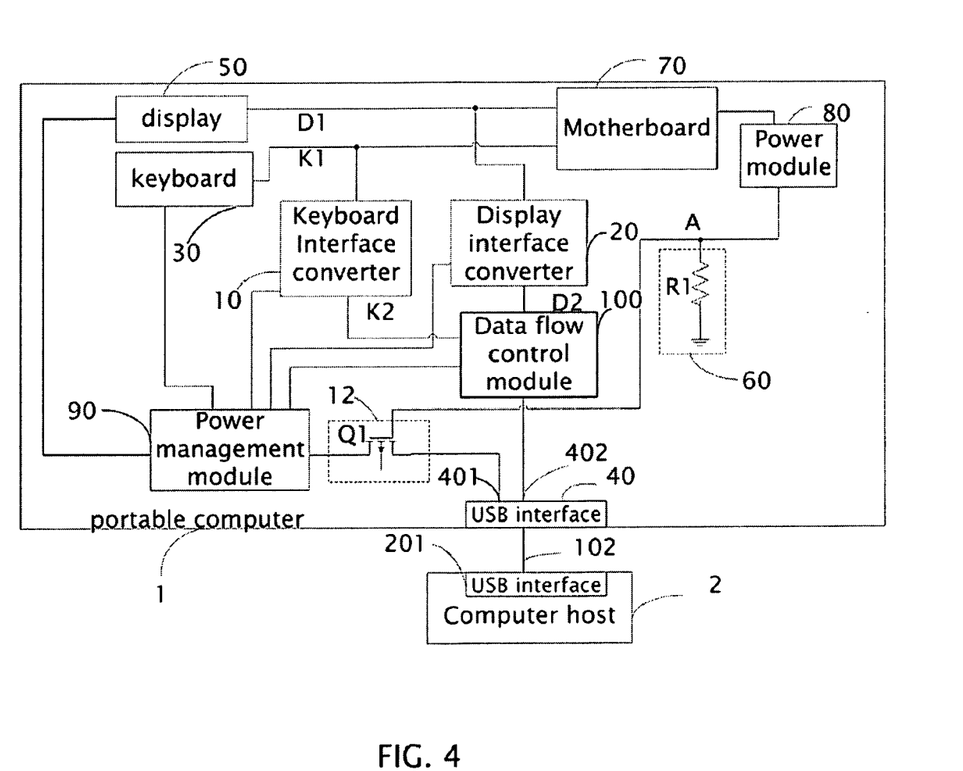
FIG. 4 shows a second implementation of FIG. 2.

FIG. 4 shows a second implementation of the exemplary embodiment of FIG. 2. Compared with the first implementation, in the second implementation, two shared hardware resources 11: the keyboard 30 and a display 50 are provided. Correspondingly, two interface converters 13: the keyboard interface converter 10 and a display interface converter 20 are also provided. The display interface converter 20 is used to convert USB interface format display data D2 to display interface format data D1. In this implementation, the display interface format data D1 could be video graphics array (VGA) data or digital visual interface (DVI) data.

In the second implementation, a data flow control module 100 is further provided. The data flow control module 100 is connected between the keyboard interface converter 10, the display interface converter 20 and the data pin 402 of the USB interface 40. The data flow control module 100 is used to control data flow between the keyboard interface converter 10, the display interface converter 20 and the USB interface 40. To be specific, the data flow control module 100 conducts the data transmitted from the keyboard 30 to the computer host 2 and the date transmitted from the computer host 2 to the display interface converter 20. The power management module 90 provides power with suitable voltages to the keyboard 30, the display 50, the keyboard interface converter 10, the display interface converter 20 and the data flow control module 100 respectively.

When the portable computer 1 is powered on, as described in the first implementation, the power management module 90 discontinues power to the keyboard interface converter 10, the display interface converter 20, the keyboard 30, the display 50 and the data flow control module 100. As a result, the keyboard interface converter 10, the display interface converter 20 and the data flow control module 100 are disabled. The keyboard 30 and the display 40 receive power supplied from the power module 80 and communications with the motherboard 70.

When the portable computer 1 is powered off and connected to the computer host 2 via the data cable 102, as described in the first implementation, the power management module 90 distributes power from the USB interface 40 to the keyboard interface converter 10, the display interface converter 20, the keyboard 30, the display 50, and the data flow control module 100. The display interface converter 20 stores a display identifier (not shown). The display identifier is obtained by the computer host 2 in order to select a corresponding program to drive the display 50.

The keyboard interface converter 10 converts the keyboard interface format data K1 to the USB interface format keyboard data K2, and the data flow control module 100 sequentially transmits the USB interface format keyboard data K2 to the computer host 2 through the data cable 102. The computer host 2 transmits the USB interface format display data to the data flow control module 100 through the data cable 102, and the data flow control module 100 sequentially transmits the USB interface format display data D2 to the display interface converter 20. The display interface converter 20 converts the USB interface format display data D2 to the display interface format data D1, such that the display 50 can process and display the display interface format data D1. The keyboard 30 is adopted as an input device and the display 50 as a display device of the computer host 2. In other words, with such a configuration, the computer host 2 shares the keyboard 30 and the display 50 of the portable computer 1.

Figure 5:
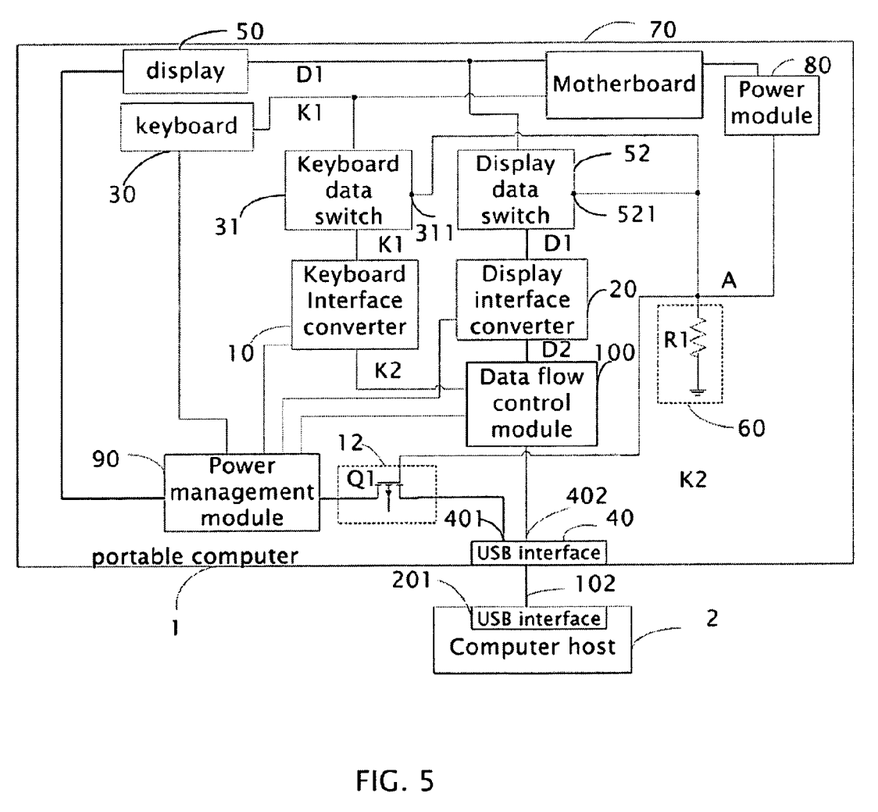
FIG. 5 shows a third implementation of FIG. 2.

FIG. 5 is a third implementation of FIG. 2. Compared with the second implementation, the portable computer 1 is further equipped with a keyboard data switch 31 and a display data switch 52. The keyboard data switch 31 is connected between the keyboard 30 and the keyboard interface converter 10, and the display data switch 52 is connected between the display 50 and the display interface converter 20. The keyboard data switch 31 includes a control terminal 311 and the display data switch 52 includes a control terminal 521 and the control terminals 311 and 521 are both connected to the control terminal A of the control module 60 together. The keyboard data switch 31 and the display data switch 52 is both switched on when the control terminals 311 and 521 are at a low voltage.

When the portable computer 1 is powered on, the control terminal A of the control module 60 is at a high voltage. The control terminals 311 and 521 are also at the high voltage. The keyboard data switch 31 and the display data switch 52 are switched off. A connection between the keyboard 30 and the keyboard interface converter 10 is cut off. Likewise, a connection between the display 50 and the display interface converter 20 is also cut off.

When the portable computer 1 is powered off, the control terminal 311 and 521 are at the low voltage. The keyboard data switch 31 and the display data switch 52 are both switched on. The keyboard 30 is connected to the keyboard interface converter 10 through the keyboard data switch 31 and the display 50 is connected to the display interface converter 20 through the display data switch 52. Then as described in the second implementation, the keyboard 30 is adopted as an input device and the display 50 as a display device of the computer host 2. The keyboard data switch 31 and the display data switch 52 can be PNP BJTs or PMOS-FETs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable computer capable of sharing hardware resources with a computer host, the portable computer comprising:
    a power module for powering on and keeping the portable computer operable;
    a shared hardware resource;
    a serial bus interface having a data pin and a power pin, the data pin being capable of transmitting data between the shared hardware resource and the computer host and the power pin being capable of receiving power from the computer host;
    an interface converter connected between the shared hardware resource and the data pin of the serial bus interface, and capable of converting the data between a shared hardware resource interface format and a serial bus interface format;
    a power management module capable of obtaining power from the power pin of the serial bus interface and distributing the power to the shared hardware resource and the interface converter;
    a power path switch capable of continuing or discontinuing the power from the serial bus interface to the power management module; and
    a control module capable of controlling the power path switch to discontinue the power when the portable computer is powered on and controlling the power path switch to supply the power when the portable computer is powered off;
    wherein, when the portable computer is powered on, the control module switches off the power path switch and discontinues the power to the power management module, the power management module discontinues the power to the shared hardware resource and the interface converter and disables the interface converter; and
    wherein, when the portable computer is powered off, the control module switches on the power path switch and continues the power from the power pin of the serial bus interface to the power management module, the power management module distributes the power to the shared hardware resource and the interface converter, then enabling the shared hardware resource to communicate with the computer host via the interface converter.

2. The portable computer of claim 1, wherein the shared hardware resource is a keyboard, the interface converter is a keyboard interface converter which is configured for converting keyboard interface format data to serial bus interface format keyboard data.

3. The portable computer of claim 1, wherein the shared hardware resource is a display, the interface converter is a display interface converter which is configured for converting serial bus interface format display data to display interface format data.

4. The portable computer of claim 1, wherein the control module is constituted by a resistor having a first terminal connected to ground and a second terminal connected both with the power path switch and the power module, when the portable computer is powered on, the second terminal of the control module is at a high voltage and switches off the power path switch, when the portable computer is powered off, the second terminal of the control module is at a low voltage and switches on the power path switch.

5. The portable computer of claim 1, wherein the portable computer further comprising a data switch to connect or disconnect the shared hardware resource from the interface converter, the data switch being switched off by the control module when the portable computer is powered on, and being switched on when the portable computer is powered off.

6. The portable computer of claim 1, wherein the power path switch is a p-channel metal-oxide-semiconductor field-effect transistor (PMOSFET).

7. The portable computer of claim 1, wherein the power path switch is a negative-positive-negative (NPN) BJT.

8. The portable computer of claim 1, wherein the serial bus interface is a USB interface.

9. The portable computer of claim 1, wherein the serial bus interface is an IEEE 1394 interface.

10. A portable computer capable of sharing hardware resources with a computer host, the portable computer comprising:
    a power module for powering on and keeping the portable computer operable;
    a plurality of shared hardware resources;
    a serial bus interface having a data pin and a power pin, the data pin being capable of transmitting data between the shared hardware resources and the computer host, and the power pin being capable of receiving power from the computer host;

a plurality of interface converters each of which is connected between the corresponding shared hardware resource and the data pin of the serial bus interface respectively and capable of converting the data between the shared hardware resource interface format and a corresponding serial bus interface format;

a power management module capable of obtaining power from the power pin of the serial bus interface and distributing the power to the shared hardware resources and the interface converters;

a power path switch capable of continuing or discontinuing the power from the serial bus interface to the power management module; and a control module capable of controlling the power path switch to discontinue the power when the portable computer is powered on and controlling the power path switch to supply the power when the portable computer is powered off;

wherein, when the portable computer is powered on, the control module switches off the power path switch and discontinues the power to the power management module, the power management module discontinues the power to the shared hardware resources and the interface converters and disables the interface converters; and wherein, when the portable computer is powered off, the control module switches on the power path switch and continues the power to the power management module, the power management module distributes the power to the shared hardware resources and the interface converters, then enabling the shared hardware resources to communicate with the computer host via the interface converters.

11. The portable computer of claim 10, wherein the shared hardware resources include a keyboard and a display, the interface converters include a keyboard interface converter and a display interface converter, the keyboard interface converter is configured for converting a keyboard interface format data to a serial bus interface format keyboard data and the display interface converter is configured for converting a serial bus interface format display data to a display interface format data.

12. The portable computer of claim 10, wherein the portable computer further comprising a data flow control module connected between the serial bus interface and the plurality of interface converters, which is configured to control the data flow between the interface converters and the serial bus interface.

13. The portable computer of claim 10, wherein the portable computer further comprising a data switch connected between each pair of a shared hardware resource and its corresponding interface converter and capable of connecting or disconnecting the shared hardware resource from the interface converter, the data switch being switched off by the control module when the portable computer is powered on, and being switched on when the portable computer is powered off.

14. The portable computer of claim 10, wherein the power path switch is a p-channel metal-oxide-semiconductor field-effect transistor (PMOSFET).

15. The portable computer of claim 10, wherein the power path switch is a negative-positive-negative (NPN) BJT.

16. The portable computer of claim 10, wherein the serial bus interface is an USB interface.

17. The portable computer of claim 10, wherein the serial bus interface is an IEEE 1394 interface.

* * * * *